(12) United States Patent
Bodin et al.

(10) Patent No.: US 7,904,467 B2
(45) Date of Patent: *Mar. 8, 2011

(54) SHORTCUT ENABLED, CONTEXT AWARE INFORMATION MANAGEMENT

(75) Inventors: William Kress Bodin, Austin, TX (US); Derral Charles Thorson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 829 days.

This patent is subject to a terminal disclaimer.

(21) Appl. No.: 11/765,198

(22) Filed: Jun. 19, 2007

(65) Prior Publication Data

US 2007/0244875 A1 Oct. 18, 2007

Related U.S. Application Data

(63) Continuation of application No. 10/046,941, filed on Jan. 15, 2002, now Pat. No. 7,310,636.

(51) Int. Cl.
*G06F 7/00* (2006.01)
*G06F 17/30* (2006.01)
(52) U.S. Cl. .......................................... 707/759; 707/804
(58) Field of Classification Search ............. 707/999.01, 707/999.004, 805, 804, 759
See application file for complete search history.

(56) References Cited

U.S. PATENT DOCUMENTS

| | | | |
|---|---|---|---|
| 4,945,476 A | 7/1990 | Bodick et al. | |
| 5,157,768 A | 10/1992 | Hoeber et al. | |
| 5,583,984 A | 12/1996 | Conrad et al. | |
| 5,721,850 A | 2/1998 | Farry et al. | |
| 5,748,975 A | 5/1998 | Van De Vanter | |
| 5,787,234 A * | 7/1998 | Molloy ................. | 707/E17.075 |
| 5,805,167 A | 9/1998 | van Cruyningen | |
| 5,828,376 A | 10/1998 | Solimene et al. | |
| 5,874,952 A | 2/1999 | Morgan | |
| 5,877,579 A | 3/1999 | Zumeris | |
| 5,877,759 A | 3/1999 | Bauer | |
| 5,907,837 A | 5/1999 | Ferrel et al. | |
| 5,924,803 A | 7/1999 | Curtin et al. | |
| 5,974,413 A | 10/1999 | Beauregard et al. | |
| 6,018,346 A | 1/2000 | Moran et al. | |
| 6,021,403 A | 2/2000 | Horvitz et al. | |
| 6,026,395 A | 2/2000 | Bennett et al. | |
| 6,047,284 A | 4/2000 | Owens et al. | |

(Continued)

OTHER PUBLICATIONS

Bill Schilit—"Why e_read? Finding Opportunities in the Merger of Paper and Computers"—The Future of Print Media Journal—Researchg—Apr. 4, 1999 (pp. 1-9).*

(Continued)

*Primary Examiner* — Jean B Fleurantin
*Assistant Examiner* — Anh Ly
(74) *Attorney, Agent, or Firm* — H. Artoush Ohanian; Justin Dillon; Biggers & Ohanian, LLP (57) ABSTRACT

A context aware, shortcut enabled system of presenting information through a user interface, implementing memory prostheses and context-oriented changes in meanings of shortcuts. Embodiments include selecting a context, receiving a shortcut entered through the user interface, the shortcut having a associated with it a shortcut field name set comprising one or more shortcut field names, and associating at least one context value to the context. Embodiments also include inferring, in dependence upon the context, a context table name and a context field name for a query, creating the query, selecting records from an information database by use of the query, whereby selected records are selected, and downloading the selected records to the client device for display.

9 Claims, 3 Drawing Sheets

Context Definition Records 302

| Context 304 | Context Table Name 238 | Context Field Name 1 308 | Context Field Name 2 310 | Default Operator 312 | Default Context Value 314 |
|---|---|---|---|---|---|
| Time | Calendar | Appt_Begin_Time | | = | now |
| Location | Address_Book | Street_Address | | = | first |
| Contacts | Address_Book | LastName | | = | first |
| | | | | | |

350

U.S. PATENT DOCUMENTS

| | | | |
|---|---|---|---|
| 6,054,987 | A | 4/2000 | Richardson |
| 6,055,531 | A | 4/2000 | Bennett et al. |
| 6,057,845 | A | 5/2000 | Dupouy |
| 6,069,628 | A | 5/2000 | Farry et al. |
| 6,075,895 | A | 6/2000 | Qiao et al. |
| 6,078,308 | A | 6/2000 | Rosenberg et al. |
| 6,091,409 | A | 7/2000 | Dickman et al. |
| 6,097,386 | A | 8/2000 | Bardon et al. |
| 6,114,978 | A | 9/2000 | Hoag |
| 6,147,993 | A | 11/2000 | Kloth et al. |
| 6,438,545 | B1 | 8/2002 | Beauregard et al. |
| 6,466,935 | B1* | 10/2002 | Stuart ............... 707/999.01 |
| 6,523,072 | B1 | 2/2003 | Howarth et al. |
| 6,694,321 | B1 | 2/2004 | Berno |
| 6,714,928 | B1 | 3/2004 | Calow |
| 6,724,402 | B1 | 4/2004 | Baquero |
| 6,725,228 | B1 | 4/2004 | Clark et al. |
| 6,732,088 | B1* | 5/2004 | Glance ............... 707/999.003 |
| 6,738,768 | B1 | 5/2004 | Johnson |
| 6,901,403 | B1* | 5/2005 | Bata et al. ............ 707/E17.005 |
| 6,925,457 | B2 | 8/2005 | Britton et al. |
| 6,959,422 | B2 | 10/2005 | Slaunwhite et al. |
| 7,010,758 | B2 | 3/2006 | Bate |
| 7,181,465 | B2* | 2/2007 | Maze et al. ............... 707/759 |
| 2001/0040590 | A1 | 11/2001 | Abbott et al. |
| 2002/0035607 | A1 | 3/2002 | Checkoway et al. |
| 2002/0107852 | A1 | 8/2002 | Oblinger |
| 2002/0115476 | A1 | 8/2002 | Padawer et al. |
| 2002/0143759 | A1 | 10/2002 | Yu |
| 2002/0156774 | A1 | 10/2002 | Beauregard et al. |
| 2003/0007012 | A1 | 1/2003 | Bate |
| 2003/0018632 | A1* | 1/2003 | Bays et al. ............... 707/3 |
| 2003/0037048 | A1 | 2/2003 | Kabra et al. |
| 2003/0090471 | A1 | 5/2003 | Slaunwhite et al. |
| 2003/0204514 | A1 | 10/2003 | Owens et al. |
| 2004/0001098 | A1 | 1/2004 | Numano |
| 2004/0075695 | A1 | 4/2004 | Chew et al. |
| 2004/0141011 | A1 | 7/2004 | Smethers et al. |
| 2004/0142720 | A1 | 7/2004 | Smethers |
| 2004/0193597 | A1 | 9/2004 | Johnson |
| 2004/0199529 | A1 | 10/2004 | Clark et al. |
| 2004/0233235 | A1 | 11/2004 | Rubin et al. |
| 2005/0005242 | A1 | 1/2005 | Hoyle |
| 2005/0005248 | A1 | 1/2005 | Rockey et al. |
| 2005/0033773 | A1 | 2/2005 | Roberge et al. |
| 2005/0160091 | A1 | 7/2005 | Daniel et al. |
| 2006/0116578 | A1 | 6/2006 | Grunwald et al. |
| 2006/0190478 | A1 | 8/2006 | Owens et al. |
| 2006/0209035 | A1 | 9/2006 | Jenkins et al. |

OTHER PUBLICATIONS

Loren Terveen and Will Hill—"Constructing, Organizing and Visualizing Collections of Topically related Web Resources"—ACM Transactions on Computer-Human Interfaction (TOCHI), vol. 6, Issue 1 Mar. 1999 (pp. 67-94).*

Abowd, et al.; "Context-Awareness in Wearable and Ubiquitous Computing"; 1997—IEEE; pp. 179-180.

Dorkick; IBM Technical Disclosure Bulletin; vol. 38, No. 05; May 1995.

Gibson, et al.; IBM Technical Disclosure Bulletin; vol. 36, No. 04; Apr. 1993.

Harter, et al.; "The Anatomy of a Context-Aware Application"; ACM; 1999; pp. 59-68.

Ng, et al.; "On Reconfiguring Query Execution Plans in Distributed Object-Relational DBMS"; Parallel and Distributed Systems, 1998; Dec. 1998; pp. 59-66.

Redpath; IBM Technical Disclosure Bulletin; vol. 41, No. 01; Jan. 1998.

Schmidt, et al.; "How to Build Smart Appliance?"; 2001—IEEE; pp. 66-71.

IBM Dossier, RSW920000055; "Methods, Systems and Computer Program Products for Obtaining Use Input to Perform Context Sensitive Web Based Operations"; Aug. 15, 2000.

* cited by examiner

| Context Definition Records 302 |||||||
|---|---|---|---|---|---|
| Context 304 | Context Table Name 238 | Context Field Name 1 308 | Context Field Name 2 310 | Default Operator 312 | Default Context Value 314 |
| Time | Calendar | Appt_Begin_Time | | = | now |
| Location | Address_Book | Street_Address | | = | first |
| Contacts | Address_Book | LastName | | = | first |
| | | | | | |

Figure 3

| Shortcut Definition Records 316 |||||||
|---|---|---|---|---|---|---|
| Shortcut Name 318 | Context 304 | Shortcut Field Name 1 320 | Shortcut Field Name 2 322 | Shortcut Field Name 3 324 | Shortcut Field Name 4 326 | Shortcut Field Name 5 328 |
| Time | Location | App_Date | ApBg_Time | ApEnd_Time | City | Attendee 1 |
| Location | Time | Date | Appt_Begin_Time | Street | City | State |
| Location | Contacts | LastName | FirstName | Street | City | State |
| | | | | | | |

SHORTCUT ENABLED, CONTEXT AWARE INFORMATION MANAGEMENT

CROSS-REFERENCE TO RELATED APPLICATION

This application is a continuation application of and claims priority from U.S. patent application Ser. No. 10/046,941, filed on Jan. 15, 2002 now U.S. Pat. No. 7,310,636.

BACKGROUND OF THE INVENTION

1. Field of the Invention

The field of the invention is data processing, or, more specifically, methods, systems, and products for shortcut enabled, context aware information management.

2. Description of Related Art

The volume of information available on-line, especially over networks, public or private, is increasing dramatically. At the same time, perhaps because of the increased volume, the difficulty of accessing the information increases also. If a user can remember where information is located, then the user is required to negotiate difficult user interfaces to obtain information. Often, however, it is difficult to remember where particular information was previously found or is presently located, creating a need for additional searching through additional difficult user interfaces. There is increasing need, therefore, for ways of aiding memory in location of information and for ways of easing the use of interfaces.

SUMMARY

Exemplary embodiments of the invention typically include a context aware, shortcut enabled method of presenting information through a user interface, implemented in software operating upon an information management database server. In some embodiments, the information management database server is typically coupled for data communications (106) to a client device (108) and the client device typically includes automated computing machinery upon which is installed and an operative user interface.

Exemplary embodiments of the invention typically include selecting a context, receiving a shortcut entered through the user interface, the shortcut having associated with it a shortcut field name set comprising one or more shortcut field names, and assigning at least one context value to the context. Exemplary embodiments typically include inferring, in dependence upon the context, a context table name and a context field name for a query, and creating the query. In typical embodiments, the query includes the context table name as a table for the query, the shortcut field names as the field names for the query, and the context field name and the context in a condition for the query. Exemplary embodiments typically include selecting records from an information database by use of the query, whereby selected records are selected and downloading the selected records to the client device for display.

In exemplary embodiments of the invention, selecting a context typically includes selecting a default context. In some embodiments, selecting a context typically includes receiving a context from the client device, where the context is entered by a user through the user interface.

Exemplary embodiments of the invention typically include repeating, in response to user input from the user interface, the steps of assigning a new context value to the context, inferring a context table name and a context field name, creating a query, selecting records, and downloading selected records. Exemplary embodiments typically include selecting a display form in dependence upon the shortcut value, where downloading the selected records to the client device for display includes downloading the selected records to the client device for display in the display form.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Introduction

The present invention is described to a large extent in this specification in terms of methods for shortcut enabled, context aware information management. Persons skilled in the art, however, will recognize that any computer system that includes suitable programming means for operating in accordance with the disclosed methods also falls well within the scope of the present invention.

Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit. The invention also may be embodied in a computer program product, such as a diskette or other recording medium, for use with any suitable data processing system.

Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

DEFINITIONS

In this specification, the following terms are used as defined here. Other terms are defined elsewhere in the specification and used as defined.

In this specification, the terms "field," "data element," and "attribute" are used as synonyms, referring to individual elements of digital data. Aggregates of data elements are referred to as "records" or "data structures." Aggregates of records are referred to as "files" or "tables." Aggregates of files are referred to as "databases." Definitions of complex data structures that include member methods, functions, or software routines in addition to data elements are referred to as "classes." Instances of complex data structures are referred to as "objects" or "class objects."

"Browser" means a Web browser, a software application for locating and displaying Web pages. Typical browsers today can display various media including text, graphics, audio and video.

"Coupled for data communications" means any form of data communications, wireless, infrared, radio, internet protocols, HTTP protocols, email protocols, networked, direct connections, dedicated phone lines, dial-ups, serial connections with RS-232 or Universal Serial Buses, hard-wired parallel port connections, and other forms of data communications as will occur to those of skill in the art.

Couplings for data communications include wireless modems using analog cellular channels, and communications using CDPD, Cellular Digital Packet Data. Couplings for data communications include wireless access points, wireless network ports according to IEEE standard 802.11, and Bluetooth piconet ports as standardized by the Bluetooth Special Interest Group, and HomeRF ports as standardized by the HomeRF Working Group, as well as infrared ports. Couplings for data communications include Bluetooth piconets implemented in accordance with the de facto industry standard known as the "Bluetooth Specification," a specification for short range radio links among mobile personal computers, mobile phones, and other portable devices.

DETAILED DESCRIPTION

Figure 1:
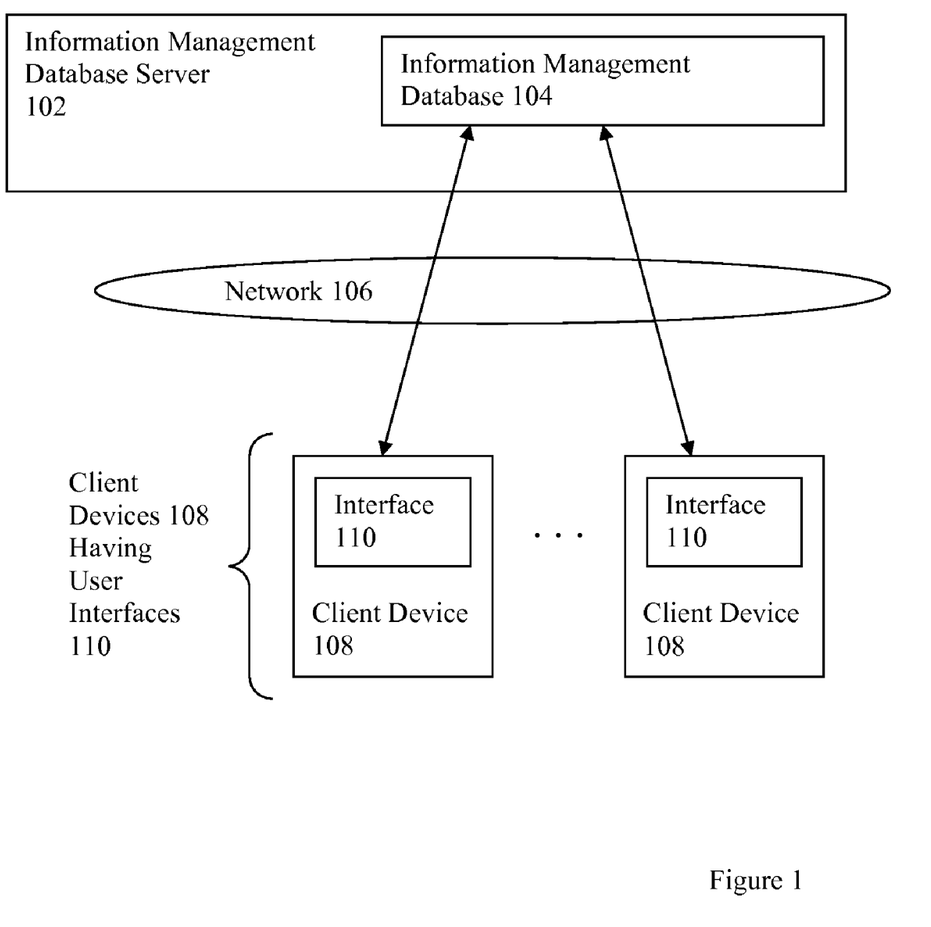
FIG. 1 is a block diagram of an exemplary embodiment.

FIG. 1 shows an exemplary embodiment that includes an information management database server (102) having installed upon it an information management database (104). In various embodiments, the information management database comprises a Lotus Notes calendaring database or a Microsoft Outlook or Exchange Database. That is, the information management database is any database accessible on-line from a multiplicity of client devices. Persons of skill in the art will think of many alternative information management databases and the use of all of them with various embodiments is well within the scope of the present invention.

The information management database server is any server capable of implementing couplings for data communications with client devices (108). Client devices (108) are any computers, including handheld devices, personal digital assistants or PDAs, network-enabled telephones, or personal computers generally, capable of effecting a couplings for data communications with an information management database server.

Figure 2:
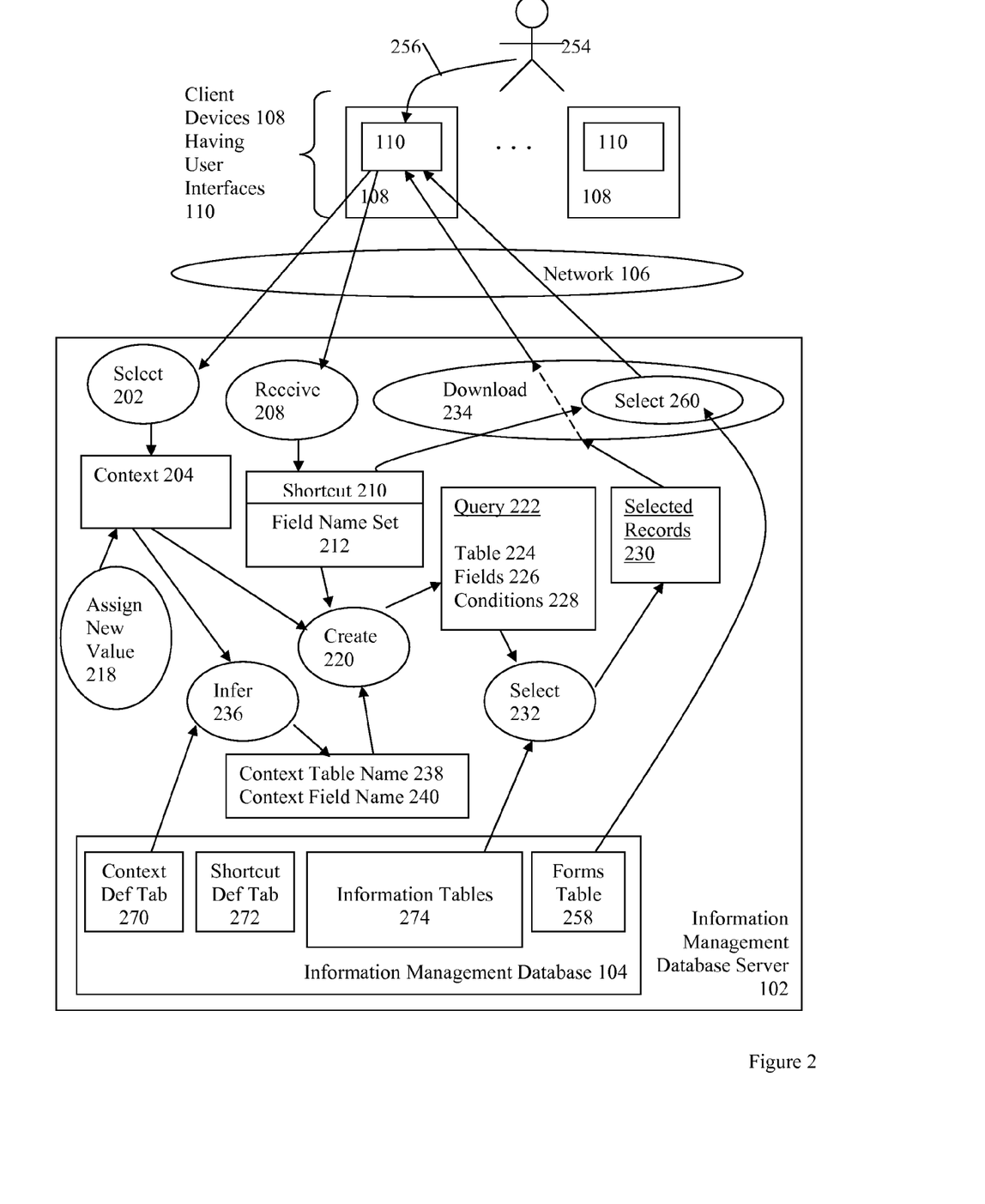
FIG. 2 is a control flow diagram of an exemplary embodiment.

Turning now to FIG. 2, further embodiments are seen as context aware, shortcut enabled methods of presenting information through a user interface implemented in software operating upon an information management database server (102). In typical embodiments, the information management database server is coupled for data communications (106) to a client device (108), and the client device includes automated computing machinery upon which is installed an operative user interface (110). Embodiments typically include selecting (202) a context (204), and receiving a shortcut (210) entered through the user interface, the shortcut having a associated with it a shortcut field name set (212) comprising one or more shortcut field names.

Figure 3:
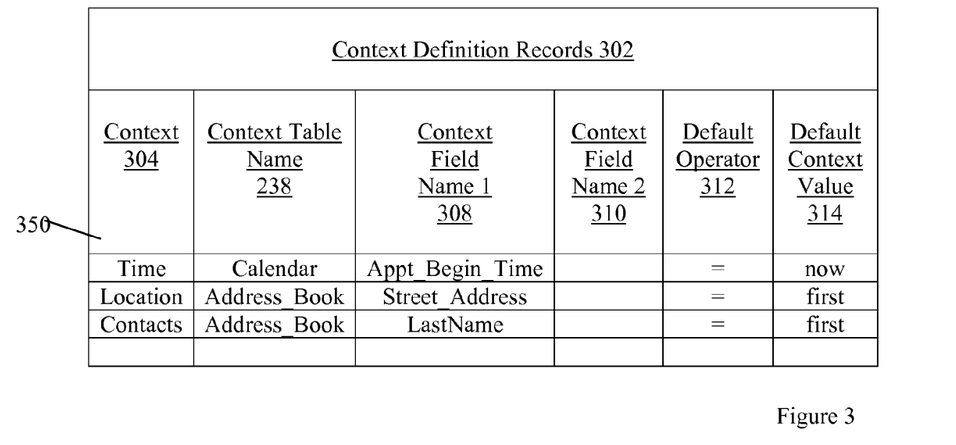
FIG. 3 sets forth example record structures for context definitions and shortcut definitions.

Exemplary embodiments also include inferring (236), in dependence upon the context (204), a context table name (238) and a context field name (240) for a query, and creating (220) the query (222). In the context of the present example, "infer" (236) or "inferring" means finding in a context definition table (270) comprised of context definition records having, for example, the structure illustrated at reference (302) on FIG. 3, a record having a context field value (304 on FIG. 3) equal to the context (204 on FIG. 2) and reading from that found record a context table name (238) and at least one context field name (308, 310). The context definition records at reference (302) on FIG. 3 are illustrated for purposes of explanation with two fields for context field names (308, 310), but context definition records can have any useful number of context field names, not just one or two. The context definition records at reference (302) on FIG. 3 are illustrated for purposes of explanation with the fields for context field names (308, 310) included in the context definition records themselves, but in other embodiments, the context field names are stored in a separate table related 'one-to-many' through a foreign key to a table containing the context definition records.

In exemplary embodiments, the query includes the context table name as a table for the query (224), the shortcut field names as the field names for the query (226), and the context field name and the context in a condition for the query (228). Exemplary embodiments further include selecting (232) records from an information database by use of the query, whereby selected records (230) are selected, and downloading (234) the selected records (230) to the client device for display.

In exemplary embodiments of the kind illustrated in FIG. 2, selecting a context includes selecting a default context. In some exemplary embodiments, selecting a context includes receiving a context from the client device, where the context is entered (256) by a user (254) through the user interface (110). Other exemplary embodiments, typically includes receiving the context (204) from the client device, where the context is entered (256) by a user (254) through the user interface (110).

In exemplary embodiments of the kind illustrated in FIG. 2, the context typically includes an initial context value. Such embodiments typically include assigning (218), in response to user input through the user interface, a new context value to the context, and repeating, in response to user input from the user interface, the steps of assigning (218) a new context value, inferring (236) a context table name and a context field name, creating (220) a query, selecting (232) records, and downloading (234) selected records.

User input through a user interface is implemented in various alternative ways across embodiments. Some embodiments implement user input through touch sensitive areas on PDAs, the touch sensitive areas being the kind sometimes referred to as 'graffiti areas.' In such embodiments, a shortcut is often implemented as a small set of stylus motions on a touch sensitive area of a PDA, in which the small set of stylus motions represents a longer set of keystrokes. For example, one kind of embodiment utilizes such small sets of stylus motions, 'graffiti shortcuts,' to indicate represent a context (204) in situations where typing the context would require many more keystrokes or stylus motions than is required by the graffiti shortcut.

Other embodiments utilize "hot keys," single or short multiple keystroke combinations representing longer combinations of keystrokes. For example, one embodiment utilizes the left and right arrow keys to indicate changes of context, the right arrow key incrementing the context (204) to the next higher value and the left arrow key decrementing the context. Other embodiments utilize graphical user interface (GUI) objects to effect user input. For example, some embodiments utilize GUI slider bars to indicate changes of context (204).

From the user's point of view, utilizing shortcuts as abbreviated forms of user input effects efficient access to data from the information management database. If, for example, context (204) is set to "date," from which is inferred (236) a context table name (238) of "calendar" and a context field name (240) of "date," context (204) is set by default to a beginning date such as "today," a shortcut (210) entry indicates "locations," a shortcut field name set (212) includes fields describing locations such as address, city, state, zip code, and a slider bar indicates changes in context, then a user has the experience of seeing as the user moves the slider bar, as a result of record selections (232) and downloads (230), a changing display of calendar event locations entered in the calendar on a sequence of dates. Moving the slider bar in the 'future' direction will rapidly or slowly, at a pace determined by the user's rate of motion of the bar, display a sequence of, for example, meeting or appointment locations, where the user has calendared meetings or appointments in future days, weeks, or months. Moving the slider bar in a 'past' direction displays a sequence of, for example, meeting or appointment locations, where the user calendared meetings or appointments in past days, weeks, or months.

If, for example, the shortcut field name set (212) includes participant name fields, a user uses the embodiment described as, in effect, a memory prosthetic, a device to quickly remind the user where meetings were held in recent weeks, for example, and who attended them, or where meetings are planned for future weeks and who is invited to attend them. The memory prosthetic benefit is achieved because of the extreme economy of keystrokes or interface events needed to access a sequence of related data records from an information management database.

Exemplary embodiments of the invention further include selecting (260) a display form (258) in dependence upon the shortcut value (210). That is, in typical embodiments, as shown in FIG. 2, downloading (234) selected records (230) to a client device (108) for display includes downloading (234) the selected records to the client device for display in a display form (258). In many embodiments, the display forms (258) are extracted from the information management database (104) and then downloaded to a client device to aid in display of selected records. Display forms include, for example, scrolling displays of rows of columns of fields and detailed views of fields from a single record or aggregations of fields from multiple related records. Other display forms will occur to those of skill in the art, and the use of any such display form is well within the scope of the present invention.

Selecting (260) display forms is accomplished in dependence upon shortcut value (210). That is, if, for example, in a "time" context, the shortcut value indicates "location," then typically in such embodiments a display form is selected that will appropriately support the display of fields indicating locations, such as, for example, forms containing display arrangements for street addresses, post office boxes, suite numbers, floor numbers, apartment numbers, cities, states, mail codes, country codes, and so on. If, for another example, in a "location" context, the shortcut value indicates "date," then typically in such embodiments a display form is selected to appropriately support the display of fields from calendar entries, such as, for example, date and beginning time and ending time of a scheduled meeting or appointment, names and affiliations of attendees or invitees, and so on.

For purposes of illustration, the following example is provided. In a typical exemplary embodiment, the step of creating the query includes inserting, into the following example query template, the values indicated in brackets:

```
SELECT <shortcut fields>
FROM <context table name>
WHERE <context field name> <relational operator> <context>
```

In this example embodiment, the information management database server includes a context definition table (270 on FIG. 2) comprising context definition records having the structure illustrated at reference (302) in FIG. 3. In this example, a user has indicated through a client device user interface that the current context is "Time." The exemplary embodiment infers (reference 236 on FIG. 2) by reference to the context definition table (270) that the context table name (238 on FIG. 3) associated with the "time" context is "Calendar." That is, the step of inferring (236) includes finding in the context definition table (270) a context definition record having a context equal to "Time" (350 on FIG. 3). The inference process in this example also reads (or "infers") from the same context definition table record (350) that the context field name (240) is "Appt_Begin_Time," a name of a field or column in the Calendar table representing the beginning time of appointments registered in the Calendar table.

In the present example, a default relational operator (312), "=", is taken also from the context definition record, and a default context (314), "now," meaning computer system clock time rounded to the nearest half hour, is also taken from the context definition record. In this example, "now" effectively means 10:00 a.m. local time at the location of the information database management server. In other embodiments, "now" is implemented to represent the present date and time at the location of a client device (108 on FIG. 2). In other embodiments, "now" is implemented to mean a data and time identified in a calendaring system located on a client device, so that the default beginning date and time for scanning calendar records in taken from a pointer on the client device. In all such exemplary embodiments, "now" represents a default starting point for scanning particular records in an information table in an information management database. Person of skill in the art will think of other implementation for a default starting pointing, all such implementations being well within the scope of the present invention.

In this example, the user also indicates through the user interface a shortcut having a shortcut identifier or shortcut name "location," which, in combination with the context set to "time," will effectively allow the user to ask very efficiently across a large number of locations, "Where was I when?" As shown in the example Shortcut Definition Record in FIG. 3, the shortcut "location" has associated with it a field name set (212) identified by shortcut field names of fields representing a street address, city, state, and two attendees. The create function (reference 220 on FIG. 2) of this example embodiment uses the shortcut field names from a Shortcut Definition Record in the shortcut definition table (270) as the shortcut fields in the query template described above. By inserting the shortcut fields, the context table name, the context field name, the relational operator, and the context into the query template, the create function (220) creates a query of the following form:

```
SELECT StreetAddr, City, State, Attendee1, Attendee2
FROM Calendar
    WHERE Appt_Begin_Time = 10:00
```

In this example, the granularity of context changes is set in a parameter setup record (not shown) as a half-hour. The users operation of a GUI slider bar or hot key in the user interface, therefore, will advance or retard the context by one half-hour for each change in position of the slider or each press of a hot key. Each such change or keypress results in creation of a new query, the same as the previous query except with a different context, that is, a new context one half-hour later or earlier than the previous one. Each such new query is used to select a new record for download and display on the user interface. In this way, the user is enabled to scroll very conveniently through a large amount of data, much more data than is stored on portable or mobile client devices such as PDAs.

In fact, in this way, the user is enabled to scroll through almost any data on any computer anywhere in the world so long as the information management database server is fitted with a query interface to a repository in which the data is located. The information management database (104) is shown in FIG. 2 in close connection to the information management database server (102). In fact, there is no restriction within the scope of the present invention regarding the relationship between the information management database server and the information management database, so long as the information management database server is coupled for data communications to the information management database in a way that enables the information management database server to assert queries against the information management database. In this way, users of client devices coupled to an information management database server are enabled to conveniently and quickly review vastly more data than can be carried on a handheld PDA.

Figure 4:
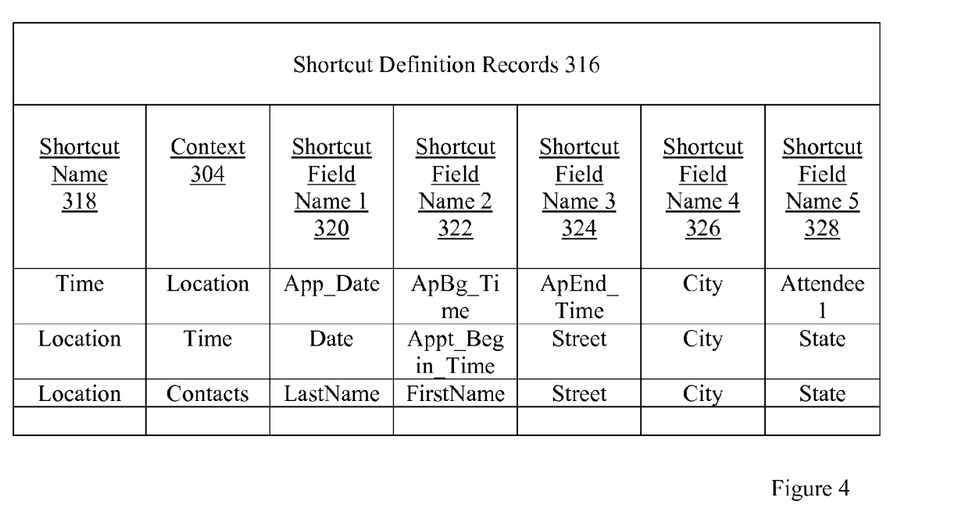
FIG. 4 sets forth a table illustrating example shortcut definitions records.

Additional examples illustrate the effect of a change in context on the meaning of a shortcut. In the example shortcut definitions records (316) in FIG. 4, there are two shortcuts named "location," one for "time" contexts and on for "contacts" contexts. In this exemplary embodiment, when the context is set to "time" and the shortcut entered by the user is the shortcut for "location," the shortcut fields are the fields storing date, time, street address, city, and state of an appointment or meeting; the context table name is "Calendar," the context field name is "Street Address;" the relational operator is "="; and the context is the first calendar entry in the calendar file. With these inputs, the create function (220) creates a query of the following exemplary form:

```
SELECT Date, Appt_Begin_Time, Street, City, State
FROM Calendar
    WHERE Street = Street Value From First Record In Calendar File
```

Similarly, when the context is set to "when the context is set to "contacts" and the shortcut entered by the user is the shortcut for "location," that is, the same shortcut as in the example just above, then the shortcut fields are the fields storing last name, first name, street address, city, and state of a contact; the context table name is "Address_Book;" the context field name is "LastName;" the relational operator is "="; and the context is the first calendar entry in the Address_ Book file. With these inputs, the create function (220) creates a query of the following exemplary form:

```
SELECT LastName, FirstName, Street, City, State
FROM Address_Book
    WHERE LastName = LastName Value From First Record
    In Address_Book
```

These last two examples show that the semantics of a shortcut change with changes in context. In the embodiment illustrated in FIG. 3, for example, the shortcut representing "location," changed meaning when the context changed from "time" to "contacts." In the user interface, the shortcut is implemented as a short keystroke combination such as, for example, Alt-L. Alternatively, the shortcut is implemented in the user interface as a custom graffiti shortcut, a few stylus strokes representing "location." The shortcut is implemented in the user interface across embodiments in many ways that will occur to those of skill in the art, all such ways being well within the scope of the present invention.

In the present example, the meaning of the shortcut for "location" changed from context to context. In the "time" context, the semantics for the "location" shortcut are effectively, "Display time and places where the user has or had appointments or meetings." In the "contacts" context, for the exact same shortcut, "location," the semantics changed to, "Display names and addresses of persons known to the user." Thus the meaning of shortcuts changes with context, and the exact same shortcut in various embodiments has many meanings depending upon the number of contexts in which the shortcut is defined.

In the example of FIG. 4, multiple shortcut records are defined for a context by inclusion of a context field (318) in the shortcut definition record structure (316). Such an arrangement effectively uses the context field as a foreign key effecting a one-to-many relationship between the shortcut records (316) and the context records (302). On the other hand, in the present example, multiple context field names (308, 310) are included within the context record structure itself, although in other embodiments, for example, multiple context field names also are embodied in a separate table or tables related to context records through a foreign key. Similarly, multiple shortcut field names (320, 322, 324, 326, 328) are included within the shortcut definition record structure (316) in the present example, although in other embodiments, for example, multiple shortcut field names are embodied in a separate table related to shortcut definition records through a foreign key. This paragraph discusses several database structures for implementation of context definitions and shortcut definitions, and many other database structures for context definitions and shortcut definitions will occur to those of skill in the art, all such structures being well within the scope of the present invention.

The examples set forth tend to discuss calendaring systems or personal information management systems merely because PDAs are a common way of implementing the present invention's use of client devices and PDAs commonly use such information systems. More specifically, the examples set forth in this specification discuss calendaring systems or personal information management systems as comprising the data in the 'information tables' (274) in an information management database (104). In fact, there is no limitation in the present invention to such systems. The present invention is useful in various embodiments to access any information in any database anywhere in the world so long as it can be coupled for data communication to an information management database server and the information management database server is authorized and enable to assert queries against it.

The example query form discussed above utilizes a format similar to the well know format of the Structured Query Language or "SQL." There is no limitation in the present invention to SQL. In fact, any query format acceptable to a subject information management database is acceptable within the scope of the present invention.

It will be understood from the foregoing description that various modifications and changes may be made in the exemplary embodiments of the present invention without departing from its true spirit. The descriptions in this specification are for purposes of illustration only and should not be construed in a limiting sense. The scope of the present invention should be limited only by the language of the following claims.

What is claimed is:

1. A context aware, shortcut enabled method of presenting information through a user interface on a client device, the method comprising the steps of:
   selecting a context; wherein a context is one or more situational parameters that dictate the semantics of a shortcut, wherein selecting a context includes selecting a default context and selecting a display form in dependence upon the shortcut value, wherein displaying selected records through the user interface on the client device further comprises downloading the selected records to the client device for display in the display form;
   receiving a shortcut entered through the user interface, the shortcut having a associated with it a shortcut field name set comprising one or more shortcut field names; wherein a shortcut is an abbreviated form of user input;
   inferring from a context definition table, in dependence upon the context, a context table name and a context field name;
   selecting information records from an information database in dependence upon the context, the context table name, the shortcut fields names, and the context field name; and
   displaying selected records through the user interface on the client device.

2. The method of claim 1 wherein selecting records further comprises creating a query, wherein the query includes:
   the context table name as a table for the query;
   the shortcut fields names as field names for the query; and
   the context and the context field name in a condition for the query.

3. The method of claim 1 wherein the context has an initial context value, and the method comprises the further steps of:
   assigning, in response to user input through the user interface, a new context value to the context; and
   repeating, in response to user input from the user interface, the steps of assigning a new context value to the context, inferring a context table name and a context field name, selecting records, and downloading selected records.

4. A context aware, shortcut enabled system of presenting information through a user interface on a client device, the system comprising:
   means for selecting a context, wherein a context is one or more situational parameters that dictate the semantics of a shortcut, wherein means for selecting a context includes means for selecting a default context and means for selecting a display form in dependence upon the shortcut value, wherein means for displaying selected records through the user interface on the client device further comprises means for downloading the selected records to the client device for display in the display form;
   means for receiving a shortcut entered through the user interface, the shortcut having a associated with it a shortcut field name set comprising one or more shortcut field names, wherein a shortcut is an abbreviated form of user input;
   means for inferring from a context definition table, in dependence upon the context, a context table name and a context field name;
   means for selecting information records from an information database in dependence upon the context, the context table name, the shortcut fields names, and the context field name; and
   means for displaying selected records through the user interface on the client device.

5. The system of claim 4 wherein means for selecting records further comprises means for creating a query, wherein the query includes:
   the context table name as a table for the query;
   the shortcut fields names as field names for the query; and
   the context and the context field name in a condition for the query.

6. The system of claim 4 wherein the context has an initial context value, and the system comprises:
   means for assigning, in response to user input through the user interface, a new context value to the context; and
   means for repeating, in response to user input from the user interface, the steps of assigning a new context value to the context, inferring a context table name and a context field name, selecting records, and downloading selected records.

7. A context aware, shortcut enabled computer program product of presenting information through a user interface on a client device, the computer program product comprising:
   a recording medium;
   means, recorded on the recording medium, for selecting a context, wherein a context is one or more situational parameters that dictate the semantics of a shortcut, wherein means, recorded on the recording medium, for selecting a context includes means, recorded on the recording medium, for selecting a default context and means, recorded on the recording medium, for selecting a display, form in dependence upon the shortcut value, wherein means, recorded on the recording medium, for displaying selected records through the user interface on the client device further comprises means, recorded on the recording medium, for downloading the selected records to the client device for display in the display, form;
   means, recorded on the recording medium, for receiving a shortcut entered through the user interface, the shortcut having a associated with it a shortcut field name set comprising one or more shortcut field names, wherein a shortcut is an abbreviated form of user input;
   means, recorded on the recording medium, for inferring from a context definition table, in dependence upon the context, a context table name and a context field name;
   means, recorded on the recording medium, for selecting information records from an information database in dependence upon the context, the context table name, the shortcut fields names, and the context field name; and
   means, recorded on the recording medium, for displaying selected records through the user interface on the client device.

8. The computer program product of claim 7 wherein means, recorded on the recording medium, for selecting records further comprises means, recorded on the recording medium, for creating a query, wherein the query includes:
   the context table name as a table for the query;
   the shortcut fields names as field names for the query; and
   the context and the context field name in a condition for the query.

9. The computer program product of claim 7 wherein the context has an initial context value, and the computer program product comprises:

means, recorded on the recording medium, for assigning, in response to user input through the user interface, a new context value to the context; and means, recorded on the recording medium, for repeating, in response to user input from the user interface, the steps of assigning a new context value to the context, inferring a context table name and a context field name, selecting records, and downloading selected records.

\* \* \* \* \*